United States Patent
Rosenstock

(10) Patent No.: US 8,111,036 B2
(45) Date of Patent: Feb. 7, 2012

(54) SYSTEM FOR ELECTRICALLY CONNECTING AND DISCONNECTING A VEHICLE GENERATOR FROM A VEHICLE STORAGE UNIT

(76) Inventor: Stephen George Rosenstock, Beaverton, OR (US)

( * ) Notice: Subject to any disclaimer, the term of this patent is extended or adjusted under 35 U.S.C. 154(b) by 1054 days.

(21) Appl. No.: 11/679,073

(22) Filed: Feb. 26, 2007

(65) Prior Publication Data

US 2007/0221422 A1 Sep. 27, 2007

Related U.S. Application Data

(60) Provisional application No. 60/785,810, filed on Mar. 27, 2006.

(51) Int. Cl.
*H02J 7/14* (2006.01)

(52) U.S. Cl. .................. 320/104; 307/10.1; 903/902

(58) Field of Classification Search .................. 320/104; 180/65.31
See application file for complete search history.

(56) References Cited

U.S. PATENT DOCUMENTS

| | | |
|---|---|---|
| 3,457,491 A | 7/1969 | Black et al. |
| 3,806,790 A | 4/1974 | Marshall |
| 3,953,740 A | 4/1976 | Seiter, Jr. |
| 4,087,662 A * | 5/1978 | Halem .................. 200/81.8 |
| 4,090,577 A * | 5/1978 | Moore .................. 180/243 |
| 4,210,856 A | 7/1980 | Taylor |
| 4,257,503 A * | 3/1981 | Lutnick ................. 192/3.23 |
| 4,392,608 A * | 7/1983 | Blades .................. 236/48 R |
| 4,453,119 A | 6/1984 | Staler et al. |
| 4,455,983 A * | 6/1984 | Fiala ..................... 123/399 |
| 4,489,242 A | 12/1984 | Worst |
| 5,418,444 A | 5/1995 | Cook et al. |
| 5,656,918 A * | 8/1997 | Pearman et al. ............. 290/23 |
| 5,823,637 A * | 10/1998 | Blue ......................... 303/7 |
| 6,515,872 B2 | 2/2003 | Nakayama et al. |
| 6,522,960 B2 * | 2/2003 | Nada ....................... 701/22 |
| 6,668,225 B2 | 12/2003 | Oh et al. |
| 6,936,934 B2 | 8/2005 | Morimoto et al. |
| 6,984,946 B2 | 1/2006 | Donnelly et al. |
| 6,986,335 B2 | 1/2006 | Sieber et al. |
| 7,028,793 B2 | 4/2006 | Hu et al. |
| 2001/0042649 A1* | 11/2001 | Maeda et al. ............. 180/65.4 |
| 2004/0026928 A1* | 2/2004 | Wakashiro et al. ......... 290/40 C |
| 2004/0049324 A1* | 3/2004 | Walker ..................... 701/1 |
| 2005/0168072 A1* | 8/2005 | Saito et al. ............... 307/10.1 |

* cited by examiner

*Primary Examiner* — Arun Williams
(74) *Attorney, Agent, or Firm* — Ostrow Kaufman LLP

(57) ABSTRACT

An energy recovery system for a vehicle uses an electric generator, such as an alternator, connected to the vehicle's engine or a wheel to recover kinetic energy when a vehicle decelerates and convert the kinetic energy into stored electrical energy. No engine controller or computer control is used to activate and deactivate the system which works using simple electrical and mechanical switches that activate and deactivate in response to the vehicle's operating conditions.

10 Claims, 4 Drawing Sheets

SYSTEM FOR ELECTRICALLY CONNECTING AND DISCONNECTING A VEHICLE GENERATOR FROM A VEHICLE STORAGE UNIT

CROSS-REFERENCE TO RELATED APPLICATIONS

This application is related to and claims priority to U.S. provisional patent application Ser. No. 60/785,810 filed 27 Mar. 2006, which is hereby incorporated by reference.

STATEMENT REGARDING FEDERALLY SPONSORED RESEARCH

Not applicable.

REFERENCE TO SEQUENCE LISTING

Not applicable.

FIELD OF THE INVENTION

The present invention relates to energy recovery systems, and particularly to systems that recover a vehicle's excess kinetic energy and convert it into stored electrical energy. The present invention also relates to a vehicle energy recovery system which can be retrofitted to a variety of vehicles including, but not limited to, cars, buses, trucks, aircraft, boats, trains and trailers and does not require computer control or programming to operate.

BACKGROUND OF THE INVENTION

Ever since the automobile was invented people have been working to make it more efficient. Obtaining the maximum energy out of the fuel that propels a vehicle is an age old problem which has been tackled in a number of manners. Recently, people have been improving vehicles' efficiencies by recovering the excess kinetic energy that is transformed into heat when a vehicle brakes or decelerates. Modern systems rely upon computer control to detect operating states of the vehicle, such as using the output from an engine control unit. Other systems are directed towards making hybrid vehicles—that is vehicles with both an electric motor and an on-board fueled electricity generator—more efficient by using the electric motor to recover and convert kinetic energy into stored electrical energy.

A major disadvantage of the modern systems is that they require modern automobiles. Computer controlled engines have been around for several years, but there are a great many automobiles being driven that do not have complex electronic controllers in them. These older automobiles are not able to take advantage of the fuel savings modern technology can offer.

Another drawback of many of the modern systems is that they are expensive and complex. Greater reliance upon computer control to operate a system increases the complexity of the system as well as the likelihood that something will malfunction.

BRIEF SUMMARY OF THE INVENTION

There is a need to provide an energy recovery system that is simple and can be installed in any vehicle. There is also a need for an inexpensive energy recovery system that can pay for itself through fuel savings in a short period of time. The present invention overcomes the inability of prior energy recovery systems by abandoning the reliance upon computer controlled operations.

Embodiments of the present invention meet the above needs, and others, by using simple switches to detect operating states of a vehicle and using the simple switches to electrically connect and disconnect a vehicle's existing electric generator to an electric storage unit. Embodiments of the present invention can be used to recover and convert kinetic energy into stored electrical energy on a range of vehicles including, without limitation, automobiles, trucks, trains, aircraft and trailers pulled by other vehicles. Embodiments of the inventive energy recovery system are formed from a few switches electrically connected between an electric generator and an electric storage unit to selectively connect and disconnect the electric generator and the electric storage unit depending upon certain velocity states of a vehicle.

The present invention has advantages over the prior art and makes a technical contribution by providing a simple energy recovery system for a vehicle that does not rely upon complex electronics and can be mounted in almost any vehicle.

BRIEF DESCRIPTION OF THE DRAWINGS

The present invention is illustrated by way of example, and not by way of limitation in the figures of the accompanying drawings in which like reference numerals refer to similar elements and in which.

DETAILED DESCRIPTION

The present invention addresses and solves problems related to providing a reliable, inexpensive energy recovery system for a vehicle. The present invention also addresses and solves problems related to providing an energy recovery system that does not require complex electronic control and can be placed into a variety of vehicles.

The present invention solves the above problems by providing a switch operated energy recovery system as discussed below. One of ordinary skill in the art will realize that the following discussion is illustrative and intended to describe preferred embodiments of the present invention and is not intended to limit the present invention to the embodiments discussed. The present invention has numerous applications where kinetic energy can be recovered and converted into stored electrical energy. The present invention may be scaled and adapted to many applications and is defined by the claims, which set forth the metes and bounds of the present invention.

Figure 1:
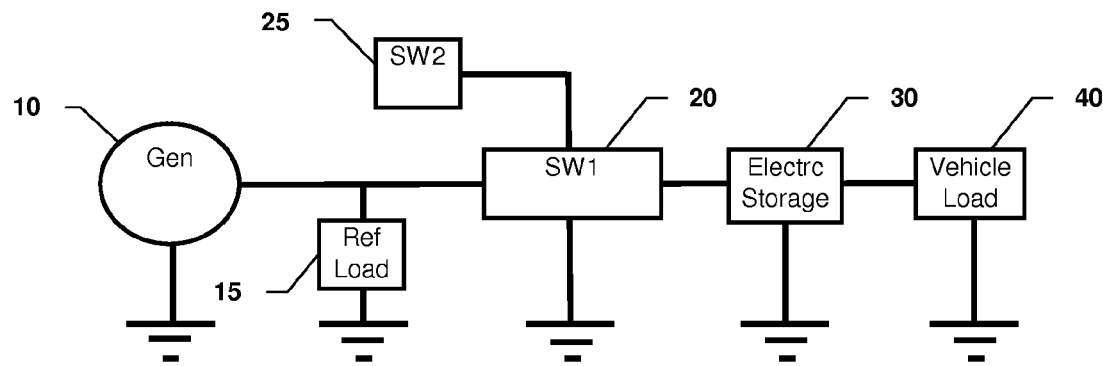
FIG. 1 is a schematic diagram of a first embodiment of the present invention.

Referring now to the drawings, and initially to FIG. 1, an improved energy recovery system is described. An electrical generator 10 is mechanically linked to a vehicle's engine as is well known in the art. In alternate embodiments, electrical generator 10 is linked to a vehicle's wheels—for example when the vehicle is a trailer and has no engine. Electrical generators 10 are commonly alternators, however other electrical generators such as DC motors for example, are within the scope of the present invention.

In most prior art vehicles, the electric generator 10 is constantly connected to a vehicle's battery which is connected to a vehicle's electric load 40. The prior art vehicles thus constantly generate electricity using the engine which consumes the engine's fuel to provide electricity for the vehicle.

Referring again to FIG. 1, the present invention selectively connects and disconnects a vehicle's electric generator 10 to and from an electric storage unit 30 to reduce the amount of fuel that is consumed to provide electricity for the vehicle. The present invention thereby increases a vehicle's fuel efficiency and also reduces wear on the brake systems.

The electric generator 10, which in many instances is an alternator, is electrically connected to a reference load 15. Other generators 10 which are not alternators do not require the reference load 15 as they do not experience the burnout problems alternators have. The reference load 15 provides a constant 12 volt source for the electric generator 10 to prevent the electric generator 10 from burning out. If some electric generators 10, such as an alternator, are operated without being connected to a 12 volt load the electric generator 10 cannot determine how much current to generate and ends up burning out. To prevent this, a reference load 15 is provided. The reference load 15 is sized according to the electric generator's 10 output and according to whether the reference load 15 will perform duties such as providing a current to start a vehicle. In the preferred embodiment, the reference load 15 is a 12 volt motorcycle battery.

The present invention takes advantage of the fact that electric generators 10, namely alternators, detect when a load cannot accept any more current and enter an idle mode. This happens when a voltage regulator in the electric generator 10 detects a predetermined voltage and electrically disconnects the rotor which then shuts down the stator current flow. By utilizing a relatively small reference load 15, the electric generator 10 constantly "sees" a 12 volt potential. This causes the electric generator 10 to essentially freewheel and not produce a significant electric current when the electric generator 10 is electrically disconnected from the electric storage unit 30. When this happens, the electric generator 10 is not producing a noticeable electric load with its attendant mechanical resistance and therefore does not require a significant amount of energy from the engine—which increases the vehicle's fuel efficiency.

In the embodiment depicted in FIG. 1, first switch 20 is normally open and prevents the electric generator 10 from electrically connecting to the electric storage unit 30. For example, when a vehicle starts the starter motor draws current from either the reference load 15 or from the electric storage unit 30 as is well known in the art. Second switch 25 is open at vehicle start as is first switch 20 so there is no electrical connection between the electric generator 10 and the electric storage unit 30.

Electric storage unit 30 is preferably a battery, including, but not limited to lead acid, nickel cadmium, lithium ion, gel, absorbed glass mat, or other battery type. Other electric storage devices, such as capacitors or fuel cells, are within the scope of the present invention.

Second switch 25 remains open during normal driving conditions, but is closed when the vehicle decelerates. When second switch 25 closes it sends a signal to first switch 20 causing first switch 20 to close. Once first switch 20 closes an electrical connection between the electric generator 10 and the electric storage unit 30 is made. Because the electric generator 10 is connected to the vehicle's engine, which is in turn connected to the vehicle's drive train, and the vehicle is decelerating, the electric generator 10 is being run predominantly by excess kinetic energy transferred from the drive train through the engine—not by fuel supplied to the engine. This excess kinetic energy is used to operate the electric generator 10 to create electricity which is supplied to the electric storage unit 30 through the closed first switch 20. Operating the electric generator 10 in this manner causes resistance due to creating electricity and causes the vehicle to further decelerate. In embodiments without an engine, such as a trailer, the present invention links to the wheels and acts as a brake while it is generating electricity from the excess kinetic energy.

When the vehicle stops decelerating second switch 25 opens and stops sending the signal to first switch 20 to close, thereby opening first switch 20. This causes the electric generator 10 to become electrically disconnected from the electric storage unit 30 and thus the electric generator 10 returns to an idle mode where it requires very little energy. The vehicle's electric load 40—including for example, lights, radios and other electric devices—is operated by the current supplied from electric storage unit 30 regardless of whether electric storage unit 30 is connected to or disconnected from the electric generator 10.

During the deceleration period electric storage unit 30 received an electric charge. For example, the electric charge is approximately 14 volts produced by the electric generator 10 which is ideal for charging a 12 volt source. The charging voltage will vary depending upon the needs of electric storage unit 30 as is well known in the art. As described in relation to FIG. 7, the electric current from electric storage unit 30 can also be transferred through items such as a transformer to supply electric power outside the vehicle.

First switch 20 is preferably an electronically controlled relay. For example, an L-Series ACR with Coil Economizer electronic relay manufactured by Blue Seas Systems™ is a durable switch for reliably connecting and disconnecting the electric generator 10 and the electric storage unit 30. Other types of switches can be used for first switch 20 as long as they disconnect and connect the electric generator 10 and the electric storage unit 30 in response to the presence or absence of an electric signal generated by another switch, such as second switch 25.

Second switch 25 can be any of a number of switches which are activated due to a change in the vehicle's velocity state. For example, second switch 25 can be a simple electric switch connected to a vehicle's brake light wires. When current flows through the brake light wires it activates second switch 25 to close, which in turn activates first switch 20 to close. With both first switch 20 and second switch 25 closed the electric generator 10 is producing electricity, as described above, which acts as a brake to further decelerate the vehicle.

The driver can maintain deceleration due to electric drag created by the electric generator 10 by lightly pressing on the vehicle's brake pedal. This prevents the mechanical brakes from contacting the rotors or drums and transforms excess kinetic energy into stored electric energy. If the user desires to stop the vehicle faster, then the brake pedal is depressed more to engage the mechanical brakes. If the user desires to stop decelerating, or accelerate, the brake pedal is returned to its non-depressed position which cuts off the electric current to the brake lights. Second switch 25 then deactivates and opens which causes first switch 20 to deactivate and open as well.

Second switch 25 can also be an accelerometer, a vacuum switch connected to a vacuum source in the engine, a pressure switch connected to a pressure source in the engine, an inertia switch, a switch measuring the rotational velocity of the vehicle's wheels or any other of a number of switches capable of detecting when a vehicle is decelerating. Second switch 25 can also be operated based upon mechanical conditions of the vehicle, for example second switch 25 could be activated when a vehicle's clutch is at a resting position and deactivates when the vehicle's clutch is activated, that is moved from its rest position, or vice versa.

An example of a vacuum switch is one that operates by detecting an increase in the manifold vacuum in a normally aspirated (non turbo or supercharged) engine. Preferably, the vacuum switch is a non-bouncing switch with a noticed hysteresis of about 4 inches of mercury to allow for activation at, for example, 25 inches of mercury and deactivation at, for example, 21 inches of mercury, to prevent the constant cycling of the switch on and off during moderate variations in vacuum. The vacuum increase causes second switch 25 to activate and operate the inventive system as described above. When the engine has more fuel and air supplied to it the manifold vacuum decreases—which occurs during vehicle acceleration. For example, a 4 inch of mercury decrease in the vacuum would deactivate second switch 25 and disconnect the electric generator 10 from the electric storage unit 30 as described above. Instead of detecting vacuum changes, a pressure switch could be used and the inventive system would then open and close the switches 25 and 20 accordingly.

Figure 2:
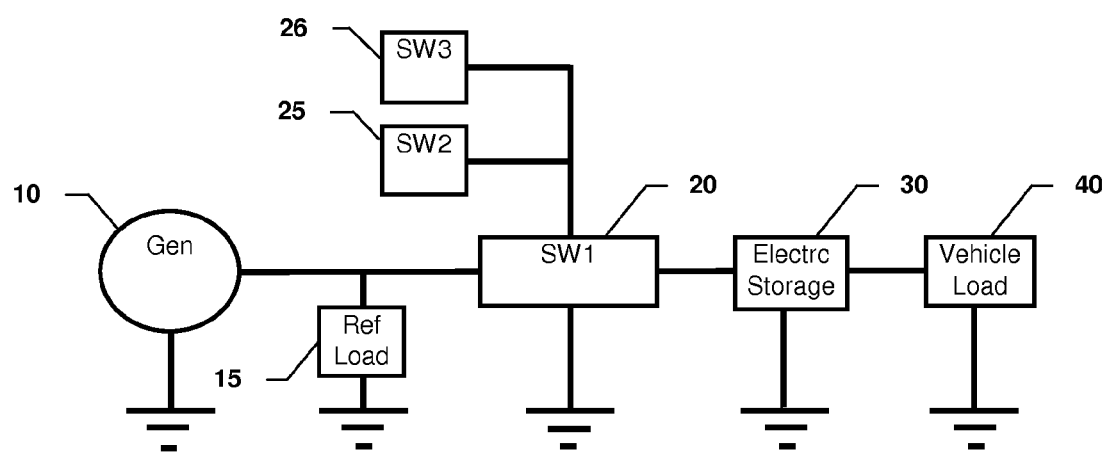
FIG. 2 is a schematic diagram of a second embodiment of the present invention.

Referring now to FIG. 2, a second embodiment of the present invention is described. The embodiment of FIG. 2 is substantially the same as that depicted in FIG. 1. A third switch 26 is included in parallel with the second switch 25 and can be any of a number of switches which activates upon a change in the vehicle's acceleration state, including, but not limited to, vacuum switches, pressure switches, accelerometers, inertia switches and rotational velocity measuring switches, as described above. By connecting the second switch 25 and the third switch 26 in parallel the inventive system can have better automatic operating characteristics.

An exemplary system has a brake light activated switch as second switch 25 and a vacuum switch as third switch 26. When a vehicle descends a hill the driver may press the brake pedal which activates the inventive system as described above. However, the driver may not want to constantly maintain recharging electric storage unit 30 through brake manipulation—especially when the electric drag created by the electric generator 10 is sufficient to keep the vehicle at an appropriate speed while descending the hill. Without the third switch 26, if the driver releases the brake pedal the inventive system would disconnect and stop generating electricity from the excess kinetic energy. But, with the third switch 26—which could be a vacuum switch for example—when the driver releases the brake pedal and opens second switch 25 the third switch 26 remains activated and closed which keeps the first switch 20 activated and closed. Therefore, the vehicle can descend the hill and convert excess kinetic energy into stored electric energy without requiring the driver to depress the brake pedal slightly during the entire descent of the hill.

Figure 3:
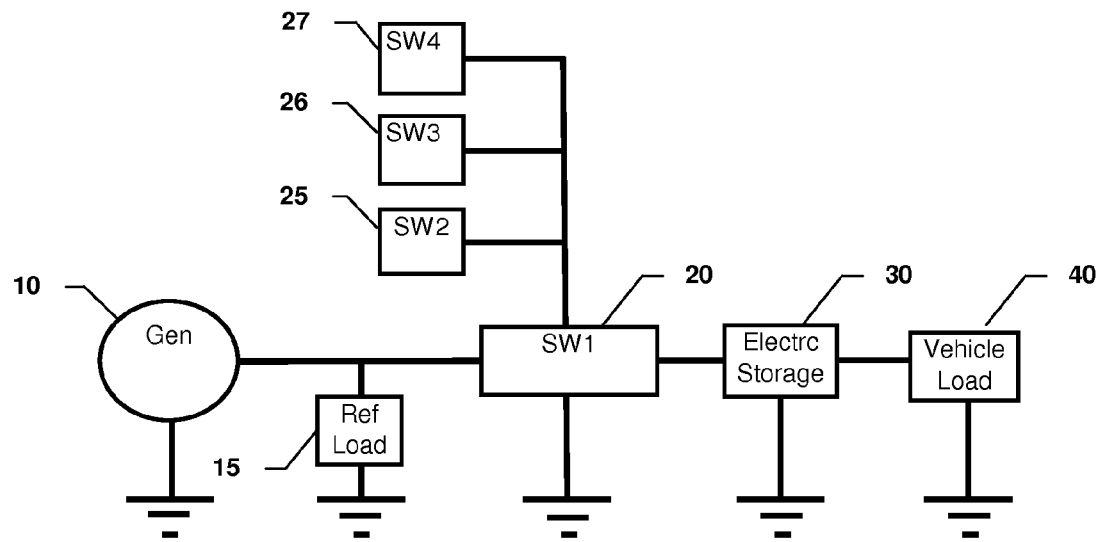
FIG. 3 is a schematic diagram of a third embodiment of the present invention.

Referring now to FIG. 3, a third embodiment of the present invention is described. The embodiment of FIG. 3 is substantially the same as that depicted in FIG. 2. A fourth switch 27 is included in parallel with the second switch 25 and the third switch 26 and can be any of a number of switches which activate upon a change in the vehicle's velocity state, including, but not limited to, vacuum switches, pressure switches, accelerometers, inertia switches and rotational velocity measuring switches, as described above. By connecting the second switch 25, the third switch 26 and the fourth switch 27 in parallel the inventive system can have better automatic operating characteristics.

Additional switches measuring different acceleration conditions of the vehicle are within the scope of the present invention. There is no limit to the number of switches that can be employed. Additionally, switches are not limited to being placed in parallel, but can be serially connected depending upon the system performance desired. One such example is described in relation to FIG. 5.

Figure 4:
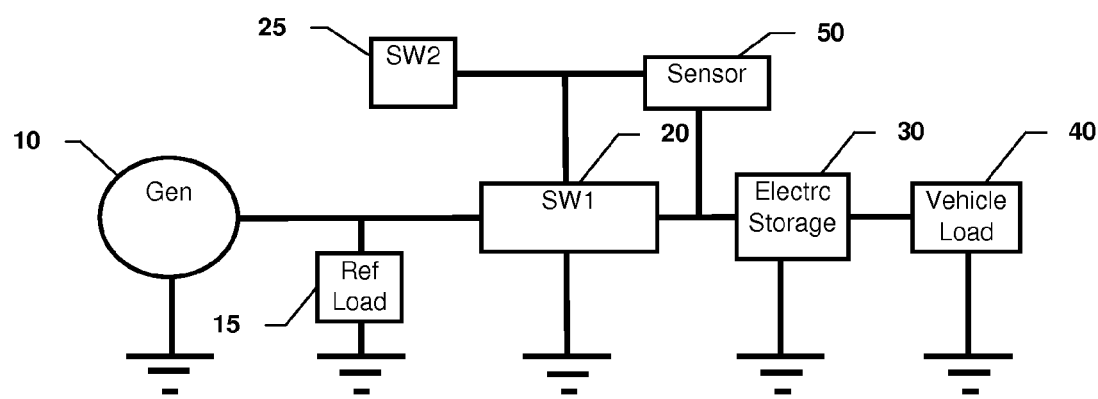
FIG. 4 is a schematic diagram of a fourth embodiment of the present invention.

Referring now to FIG. 4, a fourth embodiment of the present invention is described. In addition to the arrangement depicted in FIG. 1, a charge sensor 50 is electrically connected between the first switch 20 and the electric storage unit 30. The charge sensor 50 monitors the charge level of the electric storage unit 30 and activates upon detecting that the charge level of the electric storage unit 30 is at or below a predetermined level. For example, if the electric storage unit 30 has a 12 volt potential, but is drained to the point where only 10.5 volts remains, the charge sensor 50 sends a signal to the first switch 20 to close. An electrical connection is thus made between the electric generator 10 and the electric storage unit 30 causing electric storage unit 30 to be recharged. This may happen while the vehicle is driving at a constant velocity, accelerating or decelerating as it is dependent upon the charge level in the electric storage unit 30, not the vehicle's velocity state. The charge sensor 50 will then send a second signal to the first switch 20 to open the first switch 20 upon reaching a predetermined condition, such as the passage of a set amount of time or the charge level of the electric storage unit 30 reaching a predetermined level.

Figure 5:
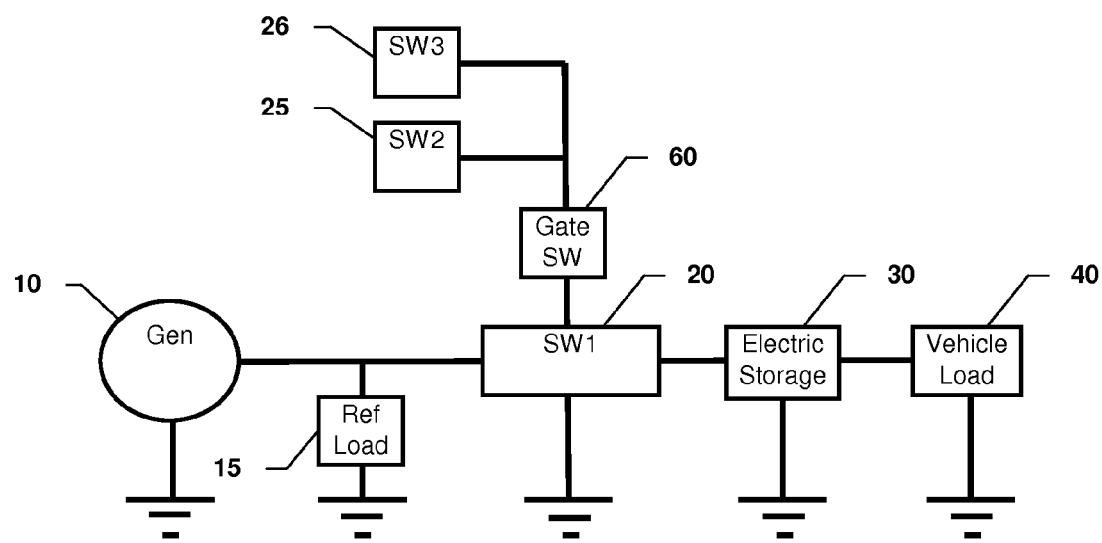
FIG. 5 is a schematic diagram of a fifth embodiment of the present invention.

Referring now to FIG. 5, a fifth embodiment of the present invention is described. The embodiment depicted in FIG. 5 is substantially the same as the embodiment depicted in FIG. 2, but with the addition of a gate switch 60 connected between the second and third switches 25, 26 and the first switch 20. Including a gate switch 60 improves the operation of the inventive system by permitting more control over when the electric generator 10 is electrically connected or disconnected from the electric storage unit 30.

Using the configuration of FIG. 2 as an example, the second switch 25 is activated by the electric current flowing to a vehicle's brake lights and the third switch 26 is activated by a vacuum increase in the engine. Gate switch 60, for example, is an accelerometer, position or inertia switch which activates when the vehicle is decelerating. Gate switch 60 could also be activated when a vehicle's clutch is at a resting position and deactivates when the vehicle's clutch is activated, that is moved from its rest position, or vice versa.

When the vehicle decelerates either, or both, second switch 25 and third switch 26 activate as described above. However, no signal is input into first switch 20 until the gate switch 60 activates. Thus, gate switch 60 can be used to refine the sensitivity of the inventive system—for example by setting a threshold level of detected deceleration before gate switch 60 activates.

Another advantage is when the vehicle is stopped, but running. Most drivers depress the brake pedal when a vehicle is stopped. Without the gate switch 60 the activation signal from the second switch 25 would cause the first switch 20 to activate and connect the electric generator 10 to the electric storage unit 30 while the vehicle idles. Since an engine's efficiency and horsepower are low at idle, and an engine's fuel burn percentage is also low at idle, this is an undesirable time to have the electric generator 10 connected to the electric storage unit 30. Since the gate switch 60 would not detect any deceleration while the vehicle is stopped it will deactivate and prevent the signal from the second switch 25 from reaching the first switch 20. Because gate switch 60 is deactivated while the vehicle is stopped, gate switch 60 also prevents any signal from the third switch 26 reaching the first switch 20. Thus, the electric generator 10 is not electrically connected to the electric storage unit 30 while the vehicle is stopped and idling.

Figure 6:
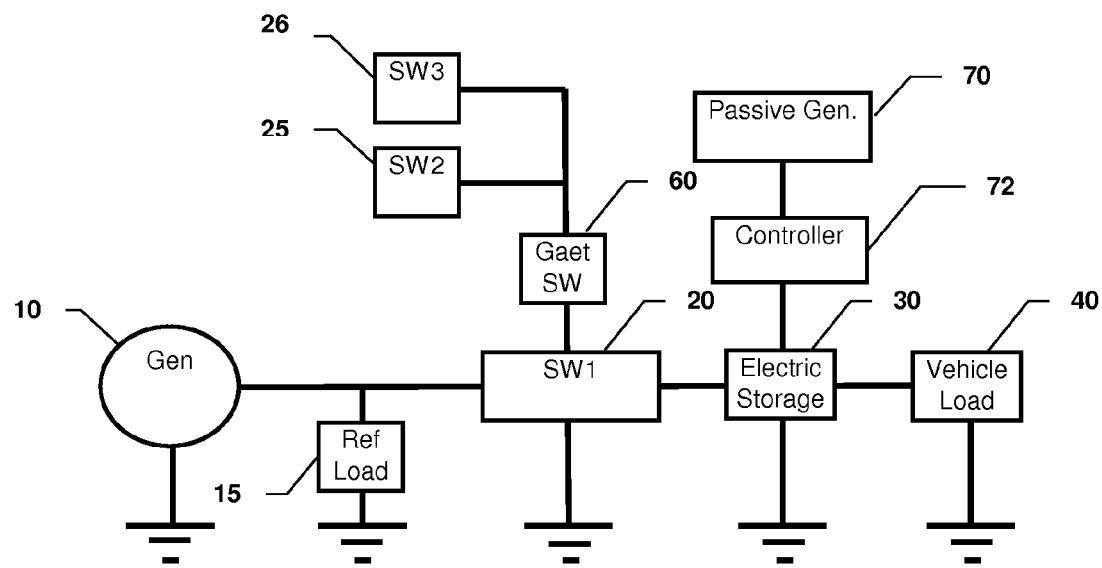
FIG. 6 is a schematic diagram of a sixth embodiment of the present invention.

Referring now to FIG. 6, a sixth embodiment of the present invention is described. The embodiment depicted in FIG. 6 is substantially the same as the embodiment depicted in FIG. 5 with the addition of a passive electricity generator 70. Passive electricity generator 70 is, for example, a solar panel, wind turbine, thermal diodes, or other item capable of generating electricity using environmental inputs. As is well known in the art, passive electricity generator 70 can have a blocking diode 72 connected between the passive electricity generator 70 and the electric storage unit 30 to prevent reverse current flow. Other items such as a PV charge controller can be utilized instead of or in conjunction with blocking diode 72 as is well known in the art. Passive electricity generator 70 supplements the recharging of electric storage unit 30 and is sized to keep the electric storage unit 30 at a nearly full charge when the vehicle is not running. This prevents degradation of electric storage unit 30's performance and helps to extend its useful lifetime.

Figure 7:
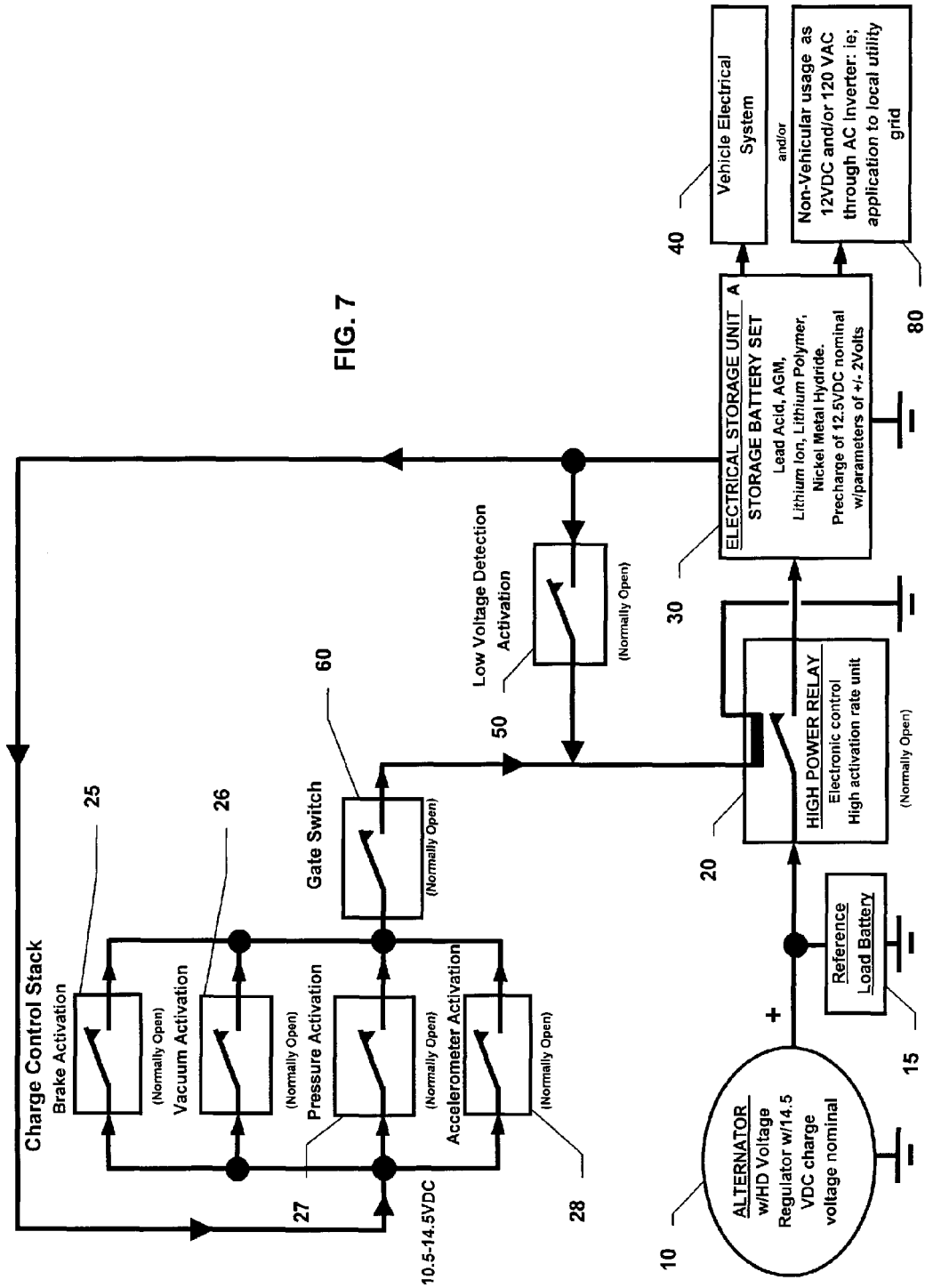
FIG. 7 is a schematic diagram of a seventh embodiment of the present invention showing multiple switches and supplying stored electrical energy outside the vehicle.

Referring now to FIG. 7, a seventh embodiment of the present invention is described. In FIG. 7 a plurality of switches 25, 26, 27 and 28 are connected in parallel to detect different conditions which indicate whether the vehicle is decelerating or not. A gate switch 60 is connected in series with the plurality of switches 25, 26, 27 and 28. In this embodiment, gate switch 60 is an optical sensor that detects the rotational velocity of the vehicle's wheels. Operation of gate switch 60 and the plurality of switches 25, 26, 27 and 28 is similar to operation of the embodiment described in relation to FIG. 5.

Charge sensor 50 is electrically connected between the first switch 20 and the electric storage unit 30 and operates as described in relation to FIG. 4.

An output device 80 is electrically connected to electric storage unit 30. For example, output device 80 is an inverter which changes the DC current from electric storage unit 30 into AC current suitable for household use, sale to an electric grid or other uses. Other devices for extracting the electric energy stored in electric storage unit 30 are well known and within the scope of the present invention and include DC as well as AC devices. Addition of an output device 80 allows a vehicle to carry a large capacity electric storage unit 30 which can then be used to provide power to non-vehicle related applications. Such an arrangement is especially useful in a vehicle, such as a trailer, that consumes very little electric power.

While this invention has been described in connection with what is presently considered to be the most practical and preferred embodiments, it is to be understood that the invention is not limited to the described embodiments, but, on the contrary, is intended to cover various modifications and equivalent arrangements included within the scope of the appended claims.

What is claimed is:

1. An energy recovery system for a non-hybrid vehicle having a fuel powered engine with a single alternator, the system comprising:
   at least one wheel mechanically connected to an the alternator, wherein the fuel powered engine is interposed between the at least one wheel and the alternator and the alternator is connected to the non-hybrid vehicle's fuel powered engine, and wherein the fuel powered engine operates the alternator and supplies electric power therewith to a vehicle's electric storage unit that is further connected to a vehicle load; and
   a non-computer controlled, switch based controller including:
   a first switch electrically connected between the alternator and the electric storage unit, wherein the first switch is operable to connect the alternator to the electric storage unit when in a closed condition and to disconnect the alternator from the storage unit when in an open condition, wherein the first switch is an electronically controlled relay;
   a second switch electrically connected to the first switch, wherein the second switch is operable to communicate a signal to operate the first switch between the closed and open conditions, wherein the second switch is one of a vacuum switch connected to a vacuum source from the engine and a mechanical switch that operates based on a mechanical condition of the vehicle, the mechanical condition of the vehicle comprising at least one of application of the vehicle's brakes and clutch;
   a charge sensor electrically connected to the electric storage unit and electrically connected to the first switch; and
   a gate switch electrically connected between the first switch and the second switch, the gate switch detects when the vehicle is stopped;
   wherein the second switch activates the first switch in response to detecting the vehicle decelerating to electrically connect the alternator to the electric storage unit and the second switch deactivates the first switch in response to detecting the vehicle accelerating to electrically disconnect the alternator from the electric storage unit,
   wherein when the charge sensor detects that the charge of the electric storage unit is at or below a predetermined level, the charge sensor causes the first switch to activate and electrically connect the alternator to the electricity storage unit until the charge sensor detects that the charge of the electric storage unit is above a predetermined level, and
   wherein the gate switch deactivates the first switch to electrically disconnect the alternator from the electric storage unit when the gate switch determines that the vehicle is stopped regardless of whether the second switch is activated.

2. The energy recovery system for a vehicle according to claim 1 wherein: the second switch is electrically connected to a vehicle brake light and is activated by an electric current which operates the brake light and is deactivated when the electric current operating the brake light stops.

3. The energy recovery system for a vehicle according to claim 1 wherein the first switch is a vacuum switch connected to a vacuum source from the engine, the system further comprising:
   a third switch electrically connected in parallel to the first switch, wherein the third switch is a mechanical switch that operates based on a mechanical condition of the vehicle, the mechanical condition of the vehicle comprising application of the vehicle's brakes;
   wherein activation of the second switch or of the third switch, or both, activates the first switch to electrically connect the alternator to the electric storage unit and deactivation of the second switch and of the third switch deactivates the first switch to electrically disconnect the alternator from the electric storage unit.

4. The energy recovery system for a vehicle according to claim 3 wherein:
the third switch is electrically connected to a vehicle brake light and is activated by an electric current which operates the brake light and is deactivated when the electric current operating the brake light stops; and
the second switch is a vacuum switch mechanically connected to a vacuum source within the engine which activates in response to a predetermined vacuum change and deactivates in response to a second predetermined vacuum change.

5. The energy recovery system for a vehicle according to claim 3 further comprising:
a fourth switch electrically connected in parallel to the first switch, wherein the fourth switch is a mechanical switch that operates based on a mechanical condition of the vehicle, the mechanical condition of the vehicle comprising application of the vehicle's clutch;
wherein activation of the second switch or of the third switch or of the fourth switch, or all three, activates the first switch to electrically connect the alternator to the electric storage unit and deactivation of the second switch and of the third switch and of the fourth switch deactivates the first switch to electrically disconnect the alternator from the electric storage unit.

6. The energy recovery system for a vehicle according to claim 5 wherein:
the third switch is electrically connected to a vehicle brake light and is activated by an electric current which operates the brake light and is deactivated when the electric current operating the brake light stops;
the second switch is a vacuum switch mechanically connected to a vacuum source within the engine which activates in response to a predetermined vacuum change and deactivates in response to a second predetermined vacuum change; and
the fourth switch detects when the vehicle is decelerating and activates in response, and detects when the vehicle is stopped, accelerating or traveling at a constant velocity and deactivates in response.

7. The energy recovery system for a vehicle according to claim 1 wherein: the gate switch detects when the vehicle is decelerating and activates the second switch in response thereto, and detects when the vehicle is stopped, traveling at a constant velocity or accelerating and deactivates the second switch in response thereto.

8. The energy recovery system for a vehicle according to claim 1 wherein: the gate switch is deactivated when a vehicle clutch is activated and activates when the vehicle clutch is at a rest position.

9. The energy recovery system for a vehicle according to claim 1 further comprising: a passive electricity generator electrically connected to the electric storage unit.

10. An energy recovery system for a non-hybrid vehicle having a fuel powered engine with a single alternator comprising:
at least a wheel mechanically connected to the fuel engine;
the engine mechanically connected to an alternator, wherein the engine is interposed between the at least one wheel and the alternator and the alternator is mechanically connected to the non-hybrid vehicle's engine so that the vehicle's engine operates the alternator;
the alternator constantly electrically connected to a reference load; and
a switch based controller operatively coupled to a plurality of switches comprising:
a first switch electrically connected between the alternator and an electric storage unit electrically connected to the first switch, wherein the first switch is operable to connect the alternator to the storage unit when in a closed condition and to disconnect the alternator from the storage unit when in an open condition, wherein the first switch is an electronically controlled relay;
a second switch electrically connected to the first switch, wherein the second switch is operable to communicate a signal to operate the first switch between the closed and open conditions, the second switch is a vacuum switch connected to a vacuum source from the engine;
a third switch electrically connected to the first switch, wherein the third switch is operable to communicate a signal to operate the first switch between the closed and open conditions, and wherein the third switch is a mechanical switch that operates based on a mechanical condition of the vehicle, the mechanical condition of the vehicle comprising at least one of application of the vehicle's brakes and clutch; and
a gate switch electrically connected between the first switch and both the second and third switches, the gate switch detects when the vehicle is stopped;
switch; and
wherein the electric storage unit is electrically connected to a vehicle electric load;
wherein activation of the second switch or of the third switch, or both, in combination with activation of the gate switch activates the first switch to electrically connect the alternator to the electric storage unit in response to detecting the vehicle decelerating; and
wherein deactivation of the second switch and of the third switch, or deactivation of the gate switch, deactivates the first switch to electrically disconnect the alternator from the electric storage unit in response to detecting the vehicle accelerating;
wherein when a charge sensor detects that the charge of the electric storage unit is at or below the reference load, the charge sensor causes the first switch to activate and electrically connect the alternator to the electricity storage unit until the charge sensor detects that the charge of the electric storage unit is above a predetermined level, and
wherein the gate switch deactivates the first switch to electrically disconnect the alternator from the electric storage unit when the gate switch determines that the vehicle is stopped regardless of whether the second switch is activated.

* * * * *